(12) United States Patent
Kotani et al.

(10) Patent No.: US 7,887,403 B2
(45) Date of Patent: Feb. 15, 2011

(54) METHOD AND SYSTEM FOR CONTROLLING A GAME INVOLVING BATTLES

(75) Inventors: Hiroyuki Kotani, Kanagawa (JP); Yukihiko Hojo, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1082 days.

(21) Appl. No.: 11/520,442

(22) Filed: Sep. 13, 2006

(65) Prior Publication Data

US 2007/0087801 A1  Apr. 19, 2007

(30) Foreign Application Priority Data

Oct. 14, 2005  (JP)  ............................ 2005-300517

(51) Int. Cl.
  *A63F 9/24*  (2006.01)
(52) U.S. Cl. ...................... 463/8; 463/7; 463/9; 463/10
(58) Field of Classification Search ...................... 463/8, 463/7, 40, 42, 9, 10
  See application file for complete search history.

(56) References Cited

U.S. PATENT DOCUMENTS

| | | | | |
|---|---|---|---|---|
| 6,340,330 | B1 * | 1/2002 | Oishi et al. | 463/8 |
| 6,354,940 | B1 * | 3/2002 | Itou et al. | 463/8 |
| 2001/0008398 | A1 * | 7/2001 | Komata | 345/156 |
| 2003/0040364 | A1 * | 2/2003 | Yabe et al. | 463/43 |

FOREIGN PATENT DOCUMENTS

| | | |
|---|---|---|
| JP | 3059732 | 3/1999 |
| JP | 11-207032 | 8/1999 |

OTHER PUBLICATIONS

"Doom (video game)", Dec. 10, 1993, Id software, published as evidence by "Doom (video game)" available online at www.wikipedia.com, printed Jun. 18, 2009, pp. 1-17.*
"Deathmatch (gaming)", created online at www.wikipedia.com printed Jun. 18, 2009, pp. 1-19.*
Notification of Reason(s) for Refusal dated Mar. 4, 2008, from the corresponding Japanese Application.
Koichi Hamamura "Wildarms the 4th Detonator Complete Guide" Enterbrain, Inc., Jul. 29, 2005, 1st Edition, pp. 102, 111, 133.
"Shadow of Rome" Dengeki PS2, vol. 11, No. 9, Media Works Co., Ltd., Mar. 25, 2005, pp. 30-31.
Decision of Refusal dated Jul. 8, 2008, from the corresponding Japanese Application.
Japanese Office Action dated Mar. 2, 2010, from the corresponding Japanese Application.

* cited by examiner

*Primary Examiner*—James S McClellan
*Assistant Examiner*—Brandon Gray
(74) *Attorney, Agent, or Firm*—Katten Muchin Rosenman LLP

(57) ABSTRACT

In a game system, a PC control unit controls an attack on an enemy character by a player's character. An enemy character control unit controls an attack on the player's character by the enemy character. An MP management unit stores, in an MP storage, a current value of a magic point indicative of the power required for a magic attack and manages an increase and decrease in the current value of the magic point. The magic point stored in the MP storage is used commonly by the player's character and the enemy character. When the player's character attacks the enemy character and the enemy character attacks the player's character, the MP management unit subtracts a value required for the attack, from the current value of the magic point.

6 Claims, 2 Drawing Sheets

METHOD AND SYSTEM FOR CONTROLLING A GAME INVOLVING BATTLES

BACKGROUND OF THE INVENTION

1. Field of the Invention

The present invention relates to a game control technique and it particularly relates to a game control program, a game control method and a game control system for controlling games including battles between a character operated by a player and enemy characters deployed in a game field.

2. Description of the Related Art

In a role-playing game (RPG), a player's character operated by a player generally encounters various enemy characters while he/she explores a game field and marches forward by defeating each of the enemy characters in battles. Since the strategies of players in the RPG change according to battle systems employed, the battle systems are a very important factor in determining the entertainment quality of the RPG.

SUMMARY OF THE INVENTION

In conventional RPGs, however, a battle system is often structured by combining existing battle systems. Thus, the patterns of such battle systems are often getting outdated and uninteresting. In view of the foregoing circumstances, the inventors of the present invention have come up with an unprecedented technology capable of realizing a novel battle system which is totally new. A general purpose of the present invention is to provide a technology realizing a highly entertaining game system.

In order to solve the above problems, there is provided a computer program product comprising: a program code module which controls an action of a player's character in a battle between the player's character and an enemy character; a program code module which controls an action of the enemy character in the battle; and a program code module which stores, in a first point storage, a current value of a first point indicative of the power required for achieving a specific ability in the battle and manages an increase and decrease in the current value of a first point, wherein the first point stored in the first point storage is shared by the player's character and the enemy character, and when the player's character exercises the specific ability or the enemy character exercises the specific ability, the module which manages a change in the current value of a first point subtracts a value required for the exercise of the specific ability, from the current value of a first point.

It is to be noted that any arbitrary combination or rearrangement of the above-described structural components and so forth are all effective as and encompassed by the present embodiments.

BRIEF DESCRIPTION OF THE DRAWINGS

Embodiments will now be described by way of examples only, with reference to the accompanying drawings which are meant to be exemplary, not limiting.

DETAILED DESCRIPTION OF THE INVENTION

The invention will now be described by reference to the preferred embodiments. This does not intend to limit the scope of the present invention, but to exemplify the invention.

A game apparatus according to an embodiment of the present invention realizes a role-playing game (RPG) in which a player's character (PC) played by a player explores a game field. When a PC encounters an enemy placed on a game field, a battle starts between the enemy character and the PC. A hit point (HP) indicative of stamina is set to the PC and the enemy characters. When the HP becomes zero or smaller than a predetermined value, the battle is considered lost. In a battle, the fighters can use attacks with weaponry or attacks by magic or special skill as well as special abilities such as recovery. When the attack is successful, a predetermined point according to the kind of attack can be subtracted from the HP of the opposing fighter. Special abilities that are exercised by magic or special skill come in such types as attack, defense, recovery, and changing of attributes and conditions. For example, whenever a magic is used, a magic point (MP) predetermined according to the type of magic used is consumed. The total of MP increases or decreases during a battle, and any magic requiring an MP higher than the current value of MP cannot be exercised.

In a conventional RPG, MP is set for each character in the same way as HP. The player devises strategies to attack enemy characters effectively while protecting his/her friends or helping them recover by making occasional use of magic within the range of MP usable by the PC and his/her friends. Contrary to this, according to the present embodiment, MP is shared by both the fellow and enemy characters. MP therefore does not belong to each specific character, but is stored, in a sense, as field energy, which is shared by all the characters participating in the battle. Hence, there naturally results a fight for MP between the friends (also referred to as "fellow characters") and the enemies (also referred to as "enemy characters"). The use of a new battle system like this creates a new pleasure of devising strategies with a new level of game entertainment.

Figure 1:
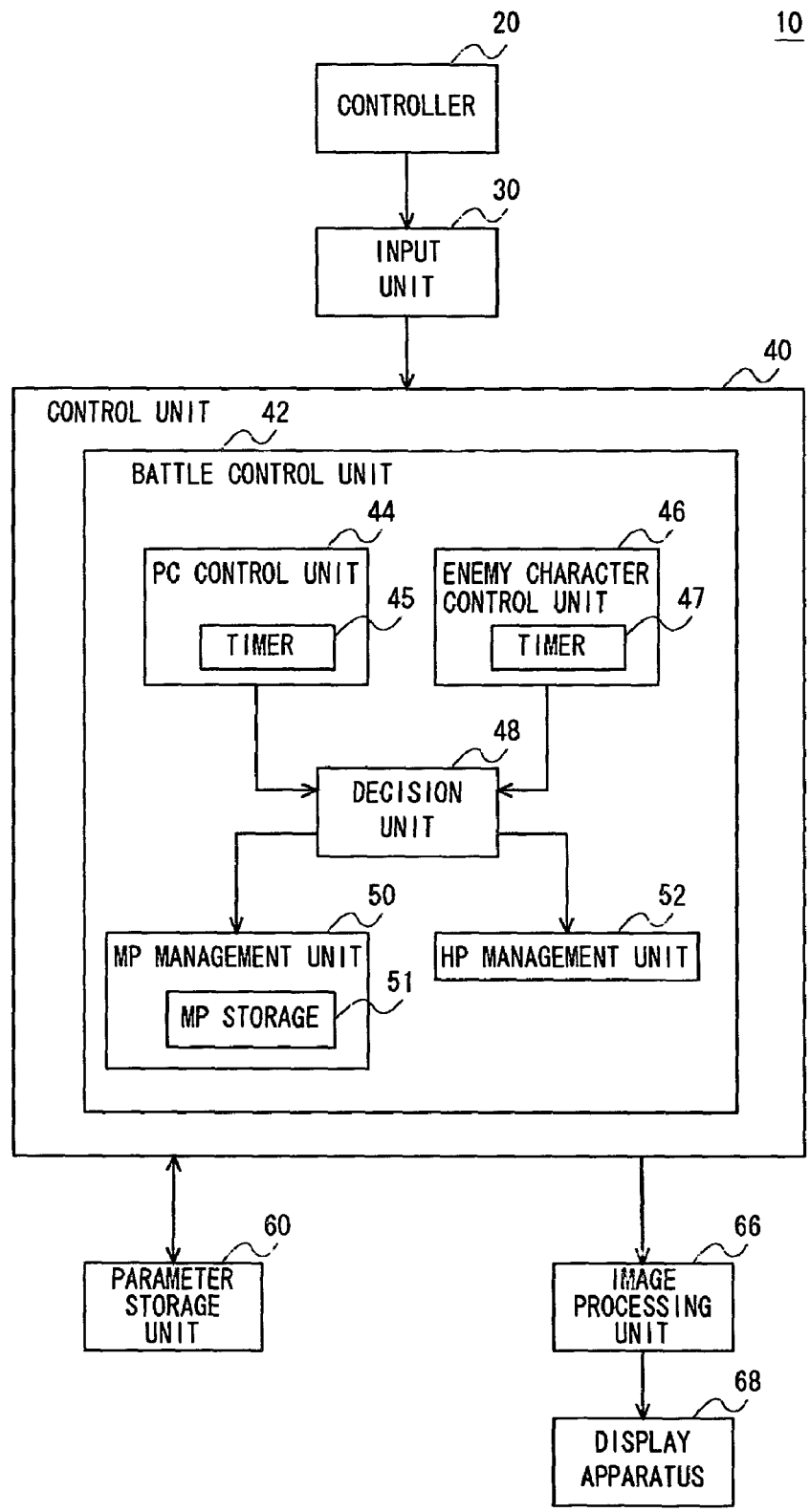
FIG. 1 illustrates a structure of a game system according to an embodiment of the present invention.

FIG. 1 illustrates a structure of a game system according to an embodiment of the present invention. The game system 10 is comprised of an input unit 30, a control unit 40, a parameter storage unit 60, an image processing unit 66 and a display apparatus 68. In terms of hardware components, each of elements in the above-mentioned structure can be realized by a CPU (Central Processing Unit), a memory, memory-loaded program and so forth, but drawn and described herein are function blocks that are realized in cooperation with those. Hence, it is understood by those skilled in the art that these function blocks can be realized in a variety of forms such as by hardware only, software only or the combination thereof.

The input unit 30 receives a control signal inputted from a controller 20 operated by a player. The control unit 40 runs a game program based on an instruction received from a user so as to proceed on the game. The parameter storage unit 60 stores parameters indicative of character attributes, such as the HP indicative of the stamina of the character, weapons and items possessed by the character and the type of magic that the character has mastered. The image processing unit 66 generates an image of the game controlled by the control unit 40 and displays it on the display apparatus 68.

The control unit 40 controls the progress of the game on the game field. When the PC meets the enemy character on the game filed, the control unit 40 has a battle control unit 42 start a battle. The battle control unit 42 controls the battle between the PC and the enemy character. The battle control unit 42 includes a PC control unit 44, an enemy character control unit 46, a decision unit 48, an MP management unit 50 and an HP management unit 52.

When the battle is started by the battle control unit 42, the MP management unit 50 stores the current value of MP and the maximum value of MP in the MP storage 51. The current value of MP at the start of the battle is set to zero. The maximum value of MP is determined in accordance with the number of characters participating in the battle. For instance, 100 points are assigned to each character, so that 400 points are set as the maximum value when four characters take part in the battle. Subsequently, the MP management unit 50 manages the increase and decrease in the MP used commonly by the PC and enemy characters. The HP management unit 52 manages the increase and decrease in the HP for each character. According to the present embodiment, when the HP of the enemy characters or fellow characters decreases due to a damage caused by the attack, a value calculated according to the damage is, in turn, added to the MP. That is, the energy accumulates in a battlefield every time the damage is given to each other. This accumulated energy takes effect on the magic. Note that the maximum value of MP may increase if a character clears a predetermined event or acquires a predetermined items so as to raise a level.

The PC control unit 44 receives an instruction on the action of PC from a player via the controller 20. The PC control unit 44 reads out the weapons possessed by the PC, the type of magic acquired by the PC and so forth from the parameter storage unit 60. Then the PC control unit 44 presents the list of selectable actions to the display apparatus 68 and receives from the player the instruction as to its selection. At this time, the PC control unit 44 refers to the current value of MP stored in the MP storage 51 and prohibits the selection of a magic that consumes the MP higher than the current value of MP. The PC control unit 44 may eliminate a magic that consumes the MP higher than the current value of MP, from the list of actions presented to the player, or may display the magic in a grayed-out manner. Since the current value of MP is reset to zero at the start of the battle, all magics are then in the unselectable state. However, at the instant when the MP is accumulated along the progress of the battle and then the MP has been accumulated which is higher than the MP consumed by the magic acquired by a PC, the magic become selectable.

The enemy character control unit 46 determines the action of the enemy character according to a predetermined thinking routine. The enemy character control unit 46 selects an action, using an artificial intelligence technique, for example, according to attribute values and capacities, such as the HP for the fighter itself and the opposing fighter, the current value of MP and so forth. The thinking routine may be changed depending on the type of the enemy character. Similarly to the PC control unit 44, the magic that consumes the MP higher than the current value of MP stored in the MP storage 51 cannot be selected in the enemy character control unit 46.

The PC control unit 44 and the enemy character control unit 46 have a timer 45 and a timer 47, respectively. The timers 45 and 47 measure the passage of time after the character executes an action. The PC control unit 44 and the enemy character control unit 46 prohibit the character's next move unless a predetermined passage of time has elapsed, and enable the next action after the predetermined length of time has elapsed. Even during a period in which the player is selecting an action from among the presented list, the timers 45 and 47 continue to measure the time and time continues to pass. Thus, if the other characters become capable of making a move even during the time when the player selects the action of PC, it is possible to suffer an attack. Accordingly, a battle system of real timeliness instead of a turn system is implemented in the present embodiment. Hence, a worry or intensity that the magic might be used by the enemy before the PC uses is created, thus further enhancing the entertainment of the game.

When the PC control unit 44 and the enemy character control unit 46 receive the selection of the attack by weapons or the use of magic, they convey the received selection to the decision unit 48. The decision unit 48 determines the success and failure of the attack and the magic according to the type of the attack and magic, the attribute of characters and the like.

When the decision unit 48 determines that the attack by weapons has been successful, the decision unit 48 conveys to the HP management unit 52 an HP to be subtracted and then calculates the value of MP to be added, based on the value of HP to be subtracted. The value of HP to be subtracted may be determined according to the type of attack and may also be calculated in consideration of additional factors such as the degree of success in attack. The value of MP to be added may be the same as the value of HP to be subtracted or may be calculated using a predetermined equation, based on the value of HP to be subtracted. The HP management unit 52 reduces, by the notified value, the HP of a character which has suffered damage wherein the HP is stored in the parameter storage unit 60. The MP management unit 50 increases, by the notified value, the current value of MP stored in the MP storage 51.

When it is determined that the use of magic has been successful, the decision unit 48 notifies the MP management unit 50 of MP to be subtracted. The value of MP to be subtracted may be not only determined based on the type of magic but also calculated in terms of how the magic has been successful. The MP management unit 50 reduces, by the notified value, the current value of MP stored in the MP storage 51.

When the decision unit 48 receives the use of magic, the decision unit 48 stands by for the length of time required for the chanting of the magic. If the character using the magic encounters an attack during the waiting time, the decision unit 48 may disable the magic. At this time, if the value of MP has been decreased, the decision unit 48 may instruct the MP management unit 50 so that this value increases to restore the original value. For example, when a character selects the execution of magic, moving pictures for chanting the magic are presented. And if the character is attacked from other characters during a period until the moving pictures are over, the magic may be cancelled. As a result, the sense of imminence which is the unique aspect of a real-time battle system can be enjoyed, thus improving the gaming capability.

Figure 2:
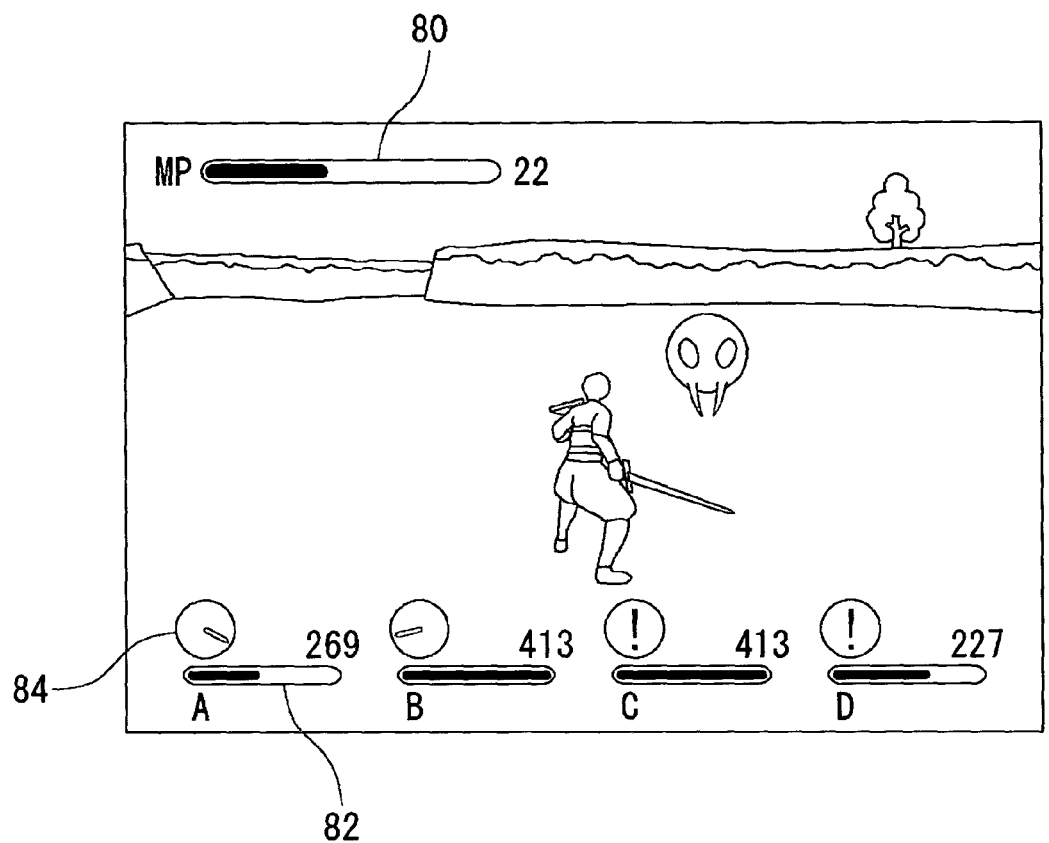
FIG. 2 illustrates an exemplary image on screen showing a battle in progress.

FIG. 2 illustrates an exemplary image on screen showing a battle in progress. The screen of FIG. 2 shows an MP meter 80, an HP meter 82, a time meter 84 and so forth. The MP meter 80 indicates the current value and the maximum value of MP. A player grasps MP accumulated so far, and seeks a chance for PC to use a magic. The time meter 84 indicates the length of time required until a character becomes able to make an action. After the character made a certain move, the next action will be prohibited until the time meter 84 goes around once completely. When the pointer of the time meter 84 makes a complete turn to display "!" mark, the next action is allowed.

In the example shown in FIG. 2, PC sides with fellow characters to form a party and a plurality of characters incorporating with one another fight against enemy characters. In this manner, when there are other fellow characters besides PC, the player may operate those characters as well. Or, an artificial intelligence unit may operate those fellow characters. In the former case, the user may have a pleasure of finding and deciding a strategy by creatively using and ingeniously selecting the magics among a plurality of characters.

In the latter case, the battle control unit further includes an artificial intelligence unit which controls the actions of fellow characters. The artificial intelligence unit may be provided such that a strategy in accordance with a battle system in a game according to the present embodiment is adopted. For example, if the enemy character has powerful magic, a magic may be used to reduce the MP, even though the use of magic is not particularly necessary, in order for the enemy character not to be able to use the powerful magic. When the enemy character selects the powerful magic, a strategy may be employed where the fellow character attacks the enemy character using the powerful magic, during the time when said magic is being chanted, so as to invalidate said magic. In this case, in order that a fellow character can attack right after the enemy character selects the magic, the fellow character may stand ready until such a time when the enemy character selects the magic even if the fellow character itself is already at the timing when it is capable of performing an action.

In this manner, according to the techniques employed in the present embodiments, the battle control is performed using a novel battle rule where the magic points required for the magic attack are shared both by the fellow characters and the enemy characters. Hence, the game player can benefit from the enjoyment in which a new and unique strategy that has never existed before can be produced. Also, the amusingness of the game is further enhanced by employing the real-time battle system.

The present invention has been described based on the preferred embodiments. These embodiments are merely exemplary. It is therefore understood by those skilled in the art that various modifications to the combination of each component and process thereof are possible and such modifications are also within the scope of the present invention.

What is claimed is:

1. A computer program embedded in a computer readable medium, comprising:

a first program code module which controls an action of a player's character in a battle between the player's character and an enemy character;

a second program code module which controls an action of the enemy character in the battle;

a third program code module which stores, in a first point storage, a current value of a first point indicative of a power required for achieving a specific ability in the battle and manages an increase and decrease in the current value of the first point; and a fourth program code module which stores, in a second point storage, a current value of a second point indicative of a vitality of the player's character and the enemy character and manages an increase and decrease in the current value of the second point, wherein when one character attacks on the other character, said program code module which manages the increase and decrease in the current value of the second point subtracts a predetermined value, as a damage caused by the attack, from the current value of the second said program code module which manages the increase and decrease in the current value of the first point adds a value calculated according to the damage caused by the attack, to the current value of the first point, the first point stored in the first point storage is shared by the player's character and the enemy character, and when the player's character exercises the specific ability or the enemy character exercises the specific ability, said program code module which manages the change in the current value of the first point subtracts a value required for the exercise of the specific ability, from the current value of the first point; and wherein when an action has been executed by a first character and thereafter the first character is attacked by a second character during a time duration until the action by the first character is completed, said first program code module which controls the action of the player's character and said second program code module which controls the action of the enemy character cancel the action by the first character and when the first point in the first point storage has been reduced by the action by the first character, said first program code module which controls the action of the player's character and said second program code module which controls the action of the enemy character restore the value by adding an value equivalent to the amount subtracted.

2. A computer program embedded in a computer readable medium according to claim 1, wherein said first program code module which controls the action of the player's character and said second program code module which controls the action of the enemy character prohibit the exercise of a specific ability that requires a value greater than the current value of the first point.

3. A computer program embedded in a computer readable medium according to claim 1, wherein said first program code module which controls the action of the player's character and said second program code module which controls the action of the enemy character allow the execution of a next action when a predetermined duration of time has elapses after the action has been executed, and allow the passage of time while the player is selecting a next action of the player's character.

4. A recording medium, readable by a computer, which stores a program executable by a computer, the program including program code modules for:

controlling an action of a player's character in a battle between the player's character and an enemy character;

controlling an action of the enemy character in the battle;

storing, in a first point storage, a current value of a first point indicative of a power required for achieving a specific ability in the battle and managing an increase and decrease in the current value of the first point; and storing, in a second point storage, a current value of a second point indicative of a vitality of the player's character and the enemy character and managing an increase and decrease in the current value of the second point, wherein when one character attacks on the other character, said managing the increase and decrease in the current value of the second point subtracts a predetermined value, as a damage caused by the attack, from the current value of the second point, said managing the increase and decrease in the current value of the first point adds a value calculated according to the damage caused by the attack, to the current value of the first point, the first point stored in the first point storage is shared by the player's character and the enemy character, and when the player's character exercises the specific ability or the enemy character exercises the specific ability, said module for managing the change in the current value of the first point subtracts a value required for the exercise of the specific ability, from the current value of the first point; and wherein when an action has been executed by a first character and thereafter the first character is attacked by a second character during a time duration until the action by the first character is completed, said first program code module which controls the action of the player's character and said second program code module which controls the action of the enemy character cancel the action by the first character and when the first point in the first point storage has been reduced by the action by the first character, said first program code module which controls the action of the player's character and said second program code module which controls the action of the enemy character restore the value by adding an value equivalent to the amount subtracted.

5. A method for controlling a game by a computer, the method comprising:

controlling by the computer an action of a player's character in a battle between the player's character and an enemy character;

controlling by the computer an action of the enemy character in the battle;

storing, in a first point storage memory, a current value of a first point indicative of a power required for achieving a specific ability in the battle and managing an increase and decrease in the current value of the first point; and storing, in a second point storage memory, a current value of a second point indicative of a vitality of the player's character and the enemy character and managing an increase and decrease in the current value of the second point, wherein when one character attacks on the other character, said managing the increase and decrease in the current value of the second point subtracts a predetermined value, as a damage caused by the attack, from the current value of the second point, said managing the increase and decrease in the current value of the first point adds a value calculated according to the damage caused by the attack, to the current value of the first point, the first point stored in the first point storage is shared by the player's character and the enemy character, and when the player's character exercises the specific ability or the enemy character exercises the specific ability, said managing the change in the current value of the first point subtracts a value required for the exercise of the specific ability, from the current value of the first point; and wherein when an action has been executed by a first character and thereafter the first character is attacked by a second character during a time duration until the action by the first character is completed, said first program code module which controls the action of the player's character and said second program code module which controls the action of the enemy character cancel the action by the first character and when the first point in the first point storage has been reduced by the action by the first character, said first program code module which controls the action of the player's character and said second program code module which controls the action of the enemy character restore the value by adding an value equivalent to the amount subtracted.

6. A game system comprising:

a player's character control unit which controls an action of a player's character in a battle between the player's character and an enemy character;

an enemy character control unit which controls an action of the enemy character in the battle; and a first point management unit which stores, in a first point storage, a current value of a first point indicative of a power required for achieving a specific ability in the battle and which manages an increase and decrease in the current value of the first point; and a second point management unit which stores, in a second point storage, a current value of a second point indicative of a vitality of the player's character and the enemy character and manages an increase and decrease in the current value of the second point, wherein when one character attacks on the other character, said second point management unit subtracts a predetermined value, as a damage caused by the attack, from the current value of the second point, said first point management unit adds a value calculated according to the damage caused by the attack, to the current value of the first point, the first point stored in the first point storage is shared by the player's character and the enemy character, and wherein when the player's character exercises the specific ability or the enemy character exercises the specific ability, said first point management unit subtracts a value required for the exercise of the specific ability, from the current value of the first point; and wherein when an action has been executed by a first character and thereafter the first character is attacked by a second character during a time duration until the action by the first character is completed, said first program code module which controls the action of the player's character and said second program code module which controls the action of the enemy character cancel the action by the first character and when the first point in the first point storage has been reduced by the action by the first character, said first program code module which controls the action of the player's character and said second program code module which controls the action of the enemy character restore the value by adding an value equivalent to the amount subtracted.

* * * * *